United States Patent Office 2,785,177
Patented Mar. 12, 1957

2,785,177

3-PYRAZOLEACETALDEHYDE HYDRAZONE

Reuben G. Jones, Indianapolis, Ind., assignor to Eli Lilly and Company, Indianapolis, Ind., a corporation of Indiana No Drawing. Application January 7, 1952,
Serial No. 265,353

1 Claim. (Cl. 260—310)

This invention relates to 3-pyrazoleacetaldehyde hydrazone and the process for its preparation.

The new compound of this invention may be represented by the formula

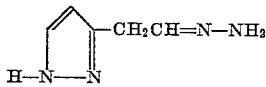

The new pyrazoleacetaldehyde hydrazone has utility as a synthtic intermediate. Thus for example, 3-pyrazoleacetaldehyde hydrazone can be hydrogenated with the aid of a hydrogenation catalyst, such as platinum, palladium and Raney nickel, to form 3-β-aminoethylpyrazole, a compound which is characterized by the ability to stimulate the gastric secretion.

The invention also encompasses a novel process for the preparation of 3-pyrazoleacetaldehyde hydrazone. Broadly speaking, the new process is carried out by subjecting γ-pyrone to the action of hydrazine, whereupon an addition and rearrangement takes place and 3-pyrazoleacetaldehyde hydrazone is formed.

The process can be carried out in inert solvent solution as, for example, in alcohol, benzene, or other solvents in which γ-pyrone is soluble and which does not of itself react with the hydrazine. Hydrazine can be provided in the reaction by the use of hydrazine or a hydrazine hydrate of any desired concentration, and preferably an excess of hydrazine is employed. If desired, a sufficient excess of hydrazine can be used so that no other solvent is necessary. The reaction is exothermic, and means for cooling the reaction mixture and preserving the solvent are preferably used when relatively large amounts of materials are reacted and substantial heat is evolved. Upon completion of the reaction, the 3-pyrazoleacetaldehyde hydrazone is readily recovered, as by evaporation of the solvent. The product can be recrystallized if desired, but generally is sufficiently pure for use in the preparation of physiologically useful compounds.

The following examples illustrate the course of the novel process and the recovery of the new 3-pyrazoleacetaldehyde hydrazone.

EXAMPLE 1

*Preparation of 3-pyrazoleacetaldehyde hydrazone*

To a cold solution of 10 g. (0.2 mole) of hydrazine hydrate in 10 ml. of methanol was added a solution of 4.8 g. (0.05 mole) of γ-pyrone in 10 ml. of methanol. An exothermic reaction took place immediately. After the reaction had subsided the clear solution was heated on the steam bath for ten minutes, and then was evaporated under reduced pressure. The resulting colorless viscous syrup slowly crystallized to a hard, white solid, comprising 3-pyrazoleacetaldehyde hydrazone, which was readily soluble in water but sparingly soluble in absolute ethanol or methanol. The solid was dissolved in warm 100 percent hydrazine, and the solution was chilled, whereupon the hydrazone separated as fine white crystals. The crystals were collected on a filter, washed with alcohol and ether and air dried.

3-pyrazoleacetaldehyde hydrazone thus prepared was stable at room temperature and melted at about 122–123° C.

*Analysis.*—Calculated for $C_5H_8N_4$: C, 48.38; H, 6.48; N, 45.15. Found: C, 48.41; H, 6.74; N, 45.20.

The process was repeated using a solution of 48 g. (0.50 mole) of γ-pyrone in 100 ml. of methanol to which a solution of 100 g. of hydrazine hydrate in 100 ml. of methanol was added over a period of about 20 minutes. The resulting solution was evaporated to a viscous syrup under reduced pressure. Th syrup was mixed with about 25 ml. of methanol, and upon standing for several hours the mixture set to a mass of white crystals of 3-pyrazoleacetaldehyde hydrazone.

EXAMPLE 2

*Preparation of 3-β-aminoethylpyrazole*

A solution of 55 g. (1.1 mole) of hydrazine hydrate in 100 ml. of methanol was cooled in a water bath and stirred while a solution of 48 g. (0.50 mole) of pure γ-pyrone in 100 ml. of methanol was added over a period of about fifteen minutes. After the addition was complete, the solution was allowed to stand at room temperature for about one hour, and was placed in a one-liter hydrogenation bomb. Twenty-five ml. of liquid ammonia were added cautiously with stirring, followed by about 15 cc. of Raney nickel catalyst. The bomb was charged with hydrogen to 1800 lbs. pressure, heated to 90° and agitated. The quantity of hydrogen required to convert the hydrazone into the desired aminoethylpyrazole was taken up in about three hours. The bomb was cooled and opened, and the contents filtered. The filtrate was evaporated under reduced pressure to remove the methanol and the residual liquid was distilled under reduced pressure, whereby there were obtained 44.5 g. (81 percent yield) of 3-β-aminoethylpyrazole boiling at 118–123° at a pressure of 0.5 mm. of Hg.

I claim:

3-pyrazoleacetaldehyde hydrazone represented by the formula:

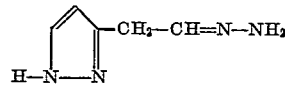

References Cited in the file of this patent

Kizhner: C. A., vol. 19, 1925, pp. 2822–2823, citing J. Russ. Phys. Chem. Soc., 55, 539–545 (1924).

Lee et al.: J. Pharmacol. Exptl. Therap., 95, 71–78 (1949).